(No Model.)

J. SEARS & O. G. BURNHAM.
FILTER.

No. 262,702. Patented Aug. 15, 1882.

WITNESSES
F. W. Adams
W. D. Adams

INVENTORS
Joseph Sears
Oliver G. Burnham
per M. E. Dayton
Attorney.

UNITED STATES PATENT OFFICE.

JOSEPH SEARS AND OLIVER G. BURNHAM, OF CHICAGO, ILLINOIS.

FILTER.

SPECIFICATION forming part of Letters Patent No. 262,702, dated August 15, 1882.

Application filed February 23, 1882. (No model.)

*To all whom it may concern:*

Be it known that we, JOSEPH SEARS and OLIVER G. BURNHAM, of Chicago, in the county of Cook and State of Illinois, have invented certain new and useful Improvements in Filters; and we do hereby declare that the following is a full, clear, and exact description thereof, reference being had to the accompanying drawings, and to the letters of reference marked thereon, which form a part of this specification.

This invention relates to improvements in filters for lard and similar substances, and has for its object a construction whereby the straining-cloth may be more conveniently cleaned or renewed.

In filters for this purpose heretofore in use a pump is employed to force the substance through the filter, which obviously requires that the filtering-vessel be tightly and strongly closed by a cover clamped or bolted in place. In order to clear or to renew the filtering-cloth, therefore, it is necessary to release and remove the cover, which operation is inconvenient and occasions objectionable delay.

The object of the present invention is to provide a construction in which the straining-cloth may be in greater or less degree cleansed while the filter is in operation, and in which the cloth may be changed or more perfectly cleaned without the trouble of loosening and removing a cover.

To this end the invention consists mainly in an open-topped trough or vessel having the space beneath the strainer closed and connected with a suction-pump, whereby the desired effect of forcing the substance through the filter is equally obtained, while leaving the cloth or strainer readily accessible.

Figure 1:
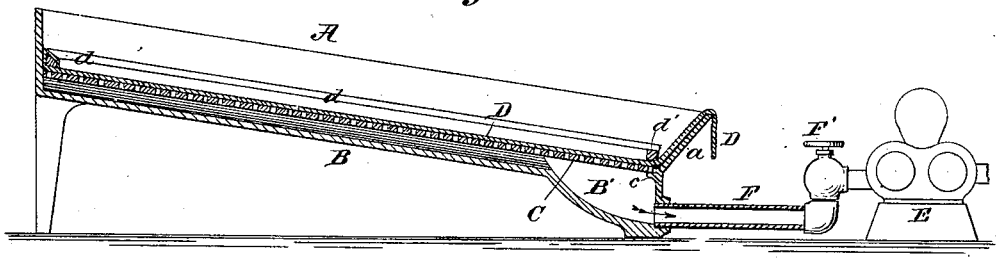
Figure 2:
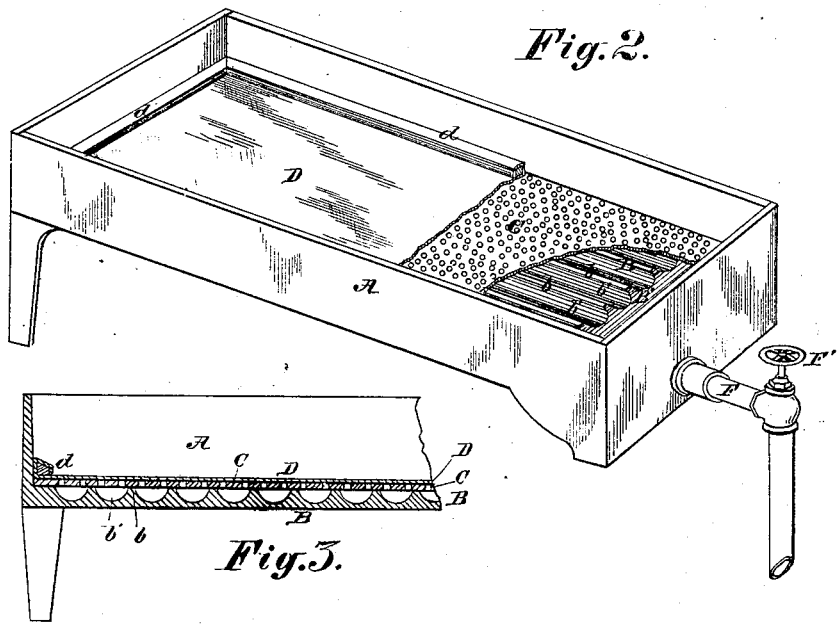
Figure 3:
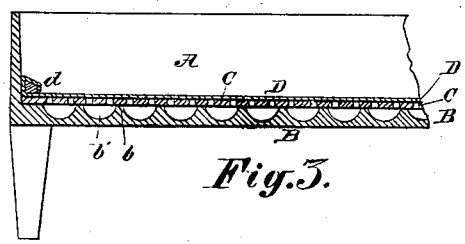

In the drawings, Figure 1 is a vertical section of the filter. Fig. 2 is a perspective view of the same, showing parts broken away. Fig. 3 is a vertical section of the filter transverse to the grooves in the bottom thereof.

A represents a trough or broad open-topped vessel, having its bottom B provided with a series of parallel narrow ribs, $b$, with intermediate grooves, $b'$.

B' is a depression at one end of the bottom B, directed transverse to the grooves $b'$.

C is a perforated plate of suitable size to set down within the vessel A, and resting on the ribs $b$, which, in order to give said plate uniform support, are preferably finished off to the same plane.

D is a cloth or canvas resting on the plate C, being of such texture as may be requisite for the proper filtration of the particular substance to be operated upon. Said cloth is here shown as being held extended over the plate C by means of a marginal frame, $d\ d'$, of which the part $d'$ is not fastened to the cloth, and is removable at pleasure. At the foot of the trough A the cloth D is also shown as overhanging the end $a$ of said trough, which end is inclined for the purpose of facilitating the removal of the residuum from the trough, as will more fully appear. The cloth C may be extended over all sides of the trough A, simply lying thereon, and the distending-frame dispensed with altogether, if preferred.

F is a pipe leading from the transverse chamber B', and affording the only outlet from the space beneath the strainer.

F' is a valve therein, if required, and E is a pump receiving from the pipe F and discharging as may be desired.

In the operation of the apparatus described the substance to be cleansed, being first delivered on the cloth D, is forcibly drawn inward through the cloth and through the aperture of the supporting-plate C into the channels $b'$, whence it flows to the transverse channel B', and thence passes through the outlet F and pump E. To facilitate the flow of the strained material toward the outlet, the trough or its bottom B is preferably inclined more or less, as shown. When it is desired to clear the meshes of the cloth D a hoe or scraper is used, by which the residuum is drawn down to the end $a$ of the trough and then removed. The inclination of the end $a$, as shown, facilitates such removal by means of the scraper, by which the residuum may be drawn over the top of said end and allowed to fall into any suitable receptacle. The cloth may be measurably cleared in this manner while the filter is in operation; but when it is desired to more perfectly clean the same the substance being filtered is entirely drawn off, after which the pump is continued in operation until, by sucking air through the cloth, the latter, together with the residuum adhering thereto or resting thereon, is quite dry, when the said residuum is readily detached and removed by a suitable scraper. Of course the renewal of the cloth involves no further delay than to simply arrest the pump to lift the old cloth out and to put a new one in its place.

The strainer being accessible to partial cleansing while the filter is in operation, and to be finally wholly cleansed or renewed with so little delay, in the manner described, the capacity of the apparatus is practically much greater than that of the old construction referred to.

We claim as our invention—

1. In a filtering apparatus, the combination, with the open vessel A, having its bottom provided with ribs $b$ and intermediate grooves, $b'$, and with the transverse space $B'$, in which the grooves terminate, of the perforated plate C, resting on the ribs $b$, the strainer-cloth D, resting on the plate C, and the suction-pump E, connected with the space $B'$, substantially as described, and for the purposes set forth.

2. In the filter described, the open trough A, having an inclined end, $a$, substantially as shown, and for the purposes set forth.

In testimony that we claim the foregoing as our invention we affix our signatures in presence of two witnesses.

JOSEPH SEARS.
OLIVER G. BURNHAM.

Witnesses:
M. E. DAYTON,
W. C. ADAMS.